H. C. SCOTT
Lamp-Wick.
No. 197,902.               Patented Dec. 4, 1877.
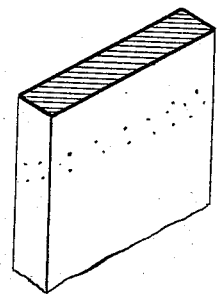
Witnesses
Richard L. Gardiner
Harry Smith
Inventor
Henry C. Scott
by his Attorneys
Howson and Son

UNITED STATES PATENT OFFICE.

HENRY C. SCOTT, OF CHICAGO, ILLINOIS.

IMPROVEMENT IN LAMP-WICKS.

Specification forming part of Letters Patent No. 197,902, dated December 4, 1877; application filed October 1, 1877.

*To all whom it may concern:*

Be it known that I, HENRY C. SCOTT, of Chicago, Illinois, have invented a new and useful Improvement in Lamp-Wicks, of which the following is a specification:

My invention relates to an improvement in incombustible and permanent lamp-wicks, which are usually made of asbestus, or of that mineral combined with other refractory substances, and are fitted into the upper portions of the wick-tubes above wicks of cotton or other fiber.

The object of my invention is to strengthen these permanent wicks, which are ordinarily of such a friable character that they are readily broken in adjusting them to their places.

In carrying out my invention I use any of the ordinary refractory wicks, preferably those made of asbestus, which are ordinarily compressed or molded to fit the wick-tube, and this wick I coat with any material which will form on the outside a re-enforcing pellicle, which will resist the action of the flame, and will not penetrate the pores or interfere with the capillarity of the wick.

A mixture of silicate of soda with lime-water and a little glue, gum, or other gelatinous or mucilaginous matter, will form an excellent coating composition, which should be applied while hot, the mixture becoming hard when it is applied to the surface of the wick, without penetrating the same, and thus forming an appropriate re-enforcing pellicle.

Calcimine, lime-water, and glue will form another composition, which may be applied with good effect.

Earthy matters, such as are used for compounding pigments, may be mixed with water, glue, or other equivalent gelatinous or gummy matter, to form a coating composition, and other materials and compositions may be employed to impart a coating which will strengthen the wick and will withstand the action of the flame.

In some cases, and for some styles of lamps, I prefer to perforate the coating by puncturing it.

I claim as my invention, and as a new manufacture—

1. A wick of refractory material, strengthened by an exterior coating.

2. A wick of refractory material having an exterior coating, perforated, as described.

In testimony whereof I have signed my name to this specification in the presence of two subscribing witnesses.

HENRY C. SCOTT.

Witnesses:
HERMANN MOESSNER,
HARRY SMITH.